United States Patent
Higham et al.

(10) Patent No.: US 6,439,509 B1
(45) Date of Patent: Aug. 27, 2002

(54) PRE-BIAS SCHEME FOR ROLL MOMENTUM UNLOADS ON PITCH MOMENTUM BIAS/YAW REACTION WHEEL SPACECRAFT

(75) Inventors: John S. Higham, Mountain View, CA (US); Rhys Kevin Adsit, Chandler, AZ (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 08/497,858

(22) Filed: Jul. 3, 1995

(51) Int. Cl.[7] .................................................. B64G 1/24
(52) U.S. Cl. ....................................... 244/164; 244/170
(58) Field of Search ............................... 244/164, 165, 244/170, 176, 194, 195; 364/434

(56) References Cited

U.S. PATENT DOCUMENTS

| | | | | |
|---|---|---|---|---|
| 4,521,855 A | * | 6/1985 | Lehner et al. ............... | 244/164 |
| 4,537,375 A | * | 8/1985 | Chan ........................... | 244/164 |
| 4,931,942 A | * | 6/1990 | Garg et al. .................. | 244/164 |
| 5,042,752 A | * | 8/1991 | Surauer et al. .............. | 244/164 |
| 5,337,981 A | * | 8/1994 | Bender ........................ | 364/434 |
| 5,597,143 A | * | 1/1997 | Surauer et al. ............. | 244/170 |

* cited by examiner

*Primary Examiner*—William A. Cuchlinski, Jr.
(74) *Attorney, Agent, or Firm*—Perman & Green, LLP

(57) ABSTRACT

An automatic, on-board system for orbiting spacecraft that controls and reduces short-term transients caused by roll momentum unloads by manipulating the states of the nutation damper through resetting one of the states in the polynomial transfer function to a value in proportion to the magnitude of the expected roll momentum unload and creating a transient equal and opposite in magnitude to that expected by the roll unload. The compensator will, of its own accord, automatically damp out the resulting transient. Thus the short-term transient is reduced without biasing the spacecraft in roll. No angle bias need be changed or removed.

7 Claims, 1 Drawing Sheet

PRE-BIAS SCHEME FOR ROLL MOMENTUM UNLOADS ON PITCH MOMENTUM BIAS/YAW REACTION WHEEL SPACECRAFT

BACKGROUND OF THE INVENTION

1. Field of the Invention

The present invention relates to the control of orbiting spacecraft and more particularly to a method and means for reducing short term transients caused by roll momentum unloads.

2. Problem to be Solved

Earth-orbiting spacecraft, such as communications satellites, require orientation control to minimize excessive movements in pitch, yaw, and roll, that can effect their remaining in proper orbit, and that can interfere with their pointing in a proper direction to insure the reception of signals transmitted therefrom at receiving stations on the ground. Various systems are provided on the spacecraft to affect this control involving momentum wheels, thrusters, magnetic torquers, sensors for yaw, roll, and pitch, a digital integrating rate assembly (DIRA), nutation dampers, etc. For example, such control systems use thrusters to unload unwanted momentum for preventing orientation drift.

In dealing with short-term transients due to disturbances such as roll momentum unloads, currently the spacecraft is biased in roll angle, approximately 50% of the magnitude, in the opposite direction of the expected transient. A problem with this approach is that the angle pre-bias must be removed at some future point, which removal can cause a transient of its own. In addition, removal timing is always critical.

It would therefore be desirable to have a system for controlling spacecraft orientation that does not rely on changing or removing the angle pre-bias.

Objects

It is accordingly an object of the present invention to provide an automatic, on-board solution to the problem of dealing with short-term transients imposed on a spacecraft due to roll momentum unloads.

It is also an object of the invention to provide a method and means for spacecraft orientation control that will reduce short-term transients due to roll momentum unloads.

It is another object of the invention to provide a system for controlling spacecraft using the nutation compensator to reduce short-term transients and avoid changing or removing the angle pre-bias.

SUMMARY OF THE INVENTION

The present invention involves the provision of an automatic, on-board system that controls and reduces short-term transients in orbiting spacecraft, caused by disturbances such as roll momentum unloads, by manipulating the states of the spacecraft's nutation compensator. The system is used to reset one of the states in the nutation compensator polynomial to a value in proportion to the magnitude of the expected roll momentum unload so as to develop a short-term transient that is equal and opposite in magnitude to that of the roll unload. The compensator will, of its own accord, automatically damp out the roll unload transient without biasing the spacecraft in roll. No angle bias need be changed or removed.

BRIEF DESCRIPTION OF THE DRAWINGS

The drawing FIGURE illustrates a form of a generic nutation compensator in the familiar Laplace s domain including a polynomial transfer function having states that are reset in accordance with the present invention.

DETAILED DESCRIPTION OF THE PREFERRED EMBODIMENT

Figure 1:
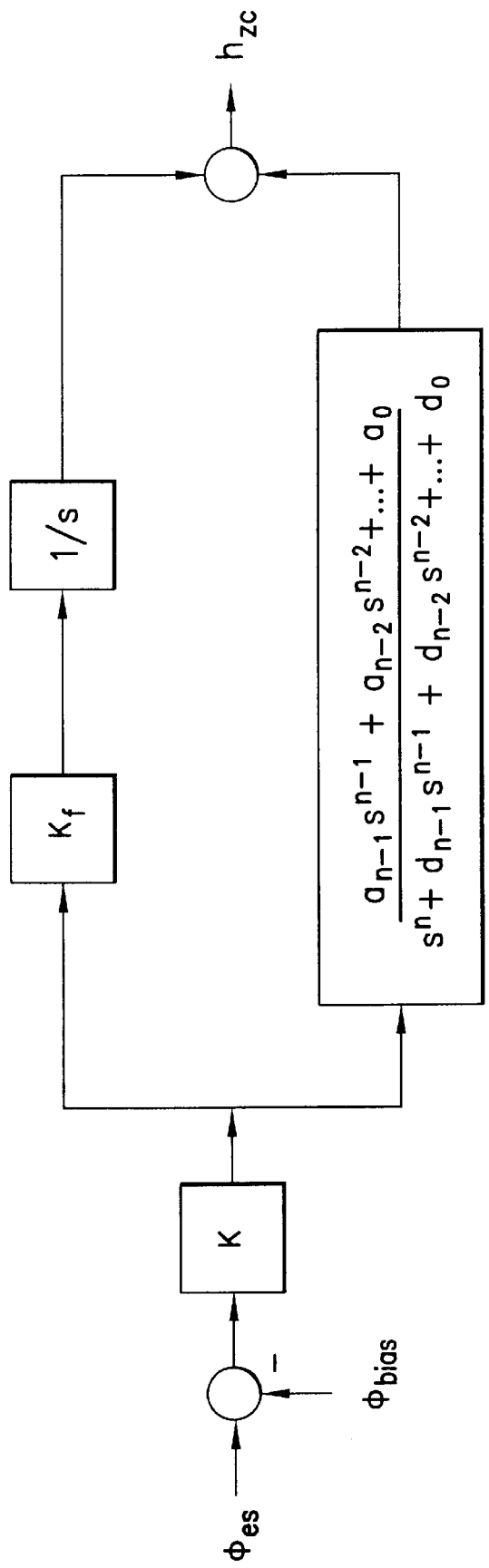

In Earth-orbiting spacecraft, such as communications satellites, on-board systems are provided that are monitored and commanded by ground observers for controlling the craft's orientation in pitch, roll, and yaw, about respective y, x, and z axes. These systems maintain the craft in proper orbit and point it in a desired direction to maximize the reception of signals transmitted therefrom to earth-based receiving stations. Each system involves orientation sensing components and means for adjusting the orientation of the craft including magnetic torquers, momentum wheels, and thrusters, which alter and unload unwanted momentum resulting from imposed forces from solar torque, thruster firing, fuel shift, and such.

The present invention is directed to such a system for controlling and reducing short-term transients caused by disturbances, such as roll momentum unloads, and utilizes the spacecraft nutation damper, particularly the nutation compensator, in achieving this end. Nutation dampers in general are described by Marshall Kaplan in MODERN SPACECRAFT DYNAMICS AND CONTROLS, published by Wiley & Sons, and nutation compensators of the type to which the present invention relates are discussed in Arthur Bryson and Yu-Chi Ho's classic work APPLIED OPTIMAL CONTROL, published by Hemisphere Press.

The system of the invention uses the nutation damper on the spacecraft and manipulates its states by resetting the nutation compensator polynomial transfer function in an appropriate manner. More particularly, a generic nutation compensator is illustrated in the drawing FIGURE. This compensator may be of any appropriate type, such as, an LQG, a PID, a lead-lag, a pole-place compensator, and the like. As seen in the FIGURE, a signal indicative of unbiased roll angle error from the horizon sensor, $\phi_{ES}$, and a signal indicative of roll angle bias from the horizon sensor, $\phi_{bias}$, are combined to create the input error signal to the compensator. The compensator is shown in the familiar Laplace s domain, and it is split into two signal paths, one of which, the upper, controls steady-state behavior, and the other of which, the lower, controls transient behavior. The open loop gain, K, is common to both signal paths. The gain $K_f$ is associated with the free integrator which controls the steady-state behavior. The polynomial transfer function, which controls the transient behavior, $$\text{i.e., } \frac{a_{n-1}s^{n-1} + a_{n-2}s^{n-2} + \cdots + a_0}{s^n + d_{n-1}s^{n-1} + d_{n-2}s^{n-2} + \cdots + d_0}$$

is of the order n and the numerator and denominator coefficients a and d can be found by any valid method known to those of skill in the art with respect to a particular application. These two signal paths are combined to produce an output signal indicative of the commanded change in yaw momentum $h_{zc}$. Associated components in the spacecraft have means for affecting the compensating forces and motions.

Instead of changing $\phi_{bias}$ to achieve the desired change in yaw momentum $h_{zc}$ to deal with short-term transients caused by roll unloads, as practiced in the prior art, in accordance with the present invention one of the states in the polynomial transfer function is reset in proportion to the expected roll momentum unload. The nutation compensator will then, of its own accord, automatically damp out the resulting transient as desired using the appropriate associated means. Thus, unlike the prior art, no $\phi_{bias}$ needs to be added, changed, or removed and further transients are avoided.

Since the polynomial transfer function governs the transient behavior, the particular state to be reset will always be found there. By selecting to reset the $n^{th}$ state in proportion to the expected roll unload and the $a_0$ term at a specific time, a short-term transient can be developed that will be equal and opposite in magnitude to the roll unload. The timing can be critical and is best found by empirical means, or heuristically, due to the infinite forms that the polynomial can have depending on the particular application, as well as nonlinearities caused by physical limitations in the control hardware.

It will accordingly be seen that a system for reducing short-term transients in a spacecraft has been disclosed wherein by intentionally disturbing the state of the nutation compensator, a transient may be created that will of its own accord damp out short-term transients due to roll momentum unloads and such. The disturbance is produced by changing the value of one of the "s'" in the polynomial, e.g., using a computer signal, which in turn creates a transient that is equal and opposite to that expected by the roll unload. Which "s" and by how much the change should be, will depend on the particular application and may be determined empirically using methods well known in the art.

What is claimed is:

1. Apparatus for reducing short-term transients, such as due to roll momentum unloads, in a spacecraft having a nutation compensator with a polynomial transfer function, $$\frac{a_{n-1}s^{n-1} + a_{n-2}s^{n-2} + \cdots + a_0}{s^n + d_{n-1}s^{n-1} + d_{n-2}s^{n-2} + \cdots + d_0},$$

comprising:
   means for resetting one of the states of the polynomial in proportion to the expected roll momentum unload and producing a signal indicative thereof; and
   means, responsive to said indicative signal, for producing an equal and opposite transient to damp out the transient due to roll unload.

2. Apparatus as in claim 1 wherein said resetting means comprises means for changing the value of one of the "s'" in said polynomial transfer function.

3. Apparatus as in claim 2 wherein said polynomial transfer function controls a transient behavior output of said nutation compensator and further comprising means in said nutation compensator for producing a steady-state behavior output.

4. Apparatus as in claim 3 wherein said nutation compensator further comprises means for combining said transient behavior output and said steady-state behavior output and producing a signal indicative of a commanded change in yaw momentum.

5. A method for reducing short-term transients in the motion of a spacecraft, due to disturbances such as roll momentum unloads, which spacecraft has a nutation compensator with a polynomial transfer function, $$\frac{a_{n-1}s^{n-1} + a_{n-2}s^{n-2} + \cdots + a_0}{s^n + d_{n-1}s^{n-1} + d_{n-2}s^{n-2} + \cdots + d_0},$$

comprising the steps of:
   resetting one of the states of said polynomial transfer function in proportion to the expected roll momentum unload; and
   allowing the equal and opposite resulting transient to damp out the transient due to roll unload.

6. The method of claim 5 wherein said resetting step comprises changing the value of one of the "s'" in [the]said polynomial transfer function.

7. A method for reducing short-term transients in the motion of a spacecraft, due to roll momentum unloads, which spacecraft has a nutation compensator with a polynomial transfer function, $$\frac{a_{n-1}s^{n-1} + a_{n-2}s^{n-2} + \cdots + a_0}{s^n + d_{n-1}s^{n-1} + d_{n-2}s^{n-2} + \cdots + d_0},$$

comprising the steps of:
   disturbing the state of the nutation compensator by changing the value of one of the "s'" in said polynomial transfer function; and
   selecting said "s" to be changed in proportion to the expected roll momentum unload to produce a transient that is equal and opposite in magnitude to that expected by the roll unload.

* * * * *